Jan. 25, 1949.  H. O. KIRKPATRICK  2,459,946
MOUNTING FOR REFRIGERATING APPARATUS AND THE LIKE
Filed Oct. 19, 1944  2 Sheets-Sheet 1

INVENTOR.
HENRY O. KIRKPATRICK
BY
ATTORNEYS

Jan. 25, 1949.  H. O. KIRKPATRICK  2,459,946
MOUNTING FOR REFRIGERATING APPARATUS AND THE LIKE
Filed Oct. 19, 1944  2 Sheets-Sheet 2

INVENTOR.
HENRY O. KIRKPATRICK
BY
ATTORNEYS

Patented Jan. 25, 1949

2,459,946

UNITED STATES PATENT OFFICE 2,459,946

MOUNTING FOR REFRIGERATING APPARATUS AND THE LIKE

Henry O. Kirkpatrick, Detroit, Mich., assignor to Advance Manufacturing, Inc., Detroit, Mich., a corporation of Michigan Application October 19, 1944, Serial No. 559,399

3 Claims. (Cl. 98—10)

This invention relates generally to air conditioning apparatus and refers more particularly to improvements in the method of installing air conditioning apparatus in closed transporting equipment such, for example, as trailers, trucks, freight cars, aircraft and the like.

One of the principal objects of this invention is to provide a relatively simple compact self contained air conditioning assembly adapted for ready installation as a unit in the selected transportation equipment and having the necessary parts for maintaining the atmosphere within the transportation equipment at a predetermined temperature regardless of the temperature existing exteriorly of the equipment.

Another object of this invention is to provide an air conditioning unit adapted for installation in positions within the equipment where it does not interfere with either loading or unloading of the transportation equipment and occupies such a small space in the equipment that it does not materially reduce the pay load of the equipment.

Still another object of the present invention is to provide an air conditioning unit which, when installed in the transportation equipment, may be conveniently serviced from a position exteriorly of the equipment without interfering with the load.

A still further object of this invention is to provide an air conditioning unit wherein the various parts thereof are supported on an open frame structure adapted to be installed in the body of the transportation equipment in such a manner that at least one side of the open frame structure is closed by one wall of the body.

A further feature of this invention is to provide an air conditioning apparatus which is a complete operable unit in that it is equipped with its own prime mover for driving the compressor and blower. In other words, the air conditioning unit is entirely independent of the power driven hauling means for the transportation equipment, and this is particularly advantageous in cases where the transportation equipment comprises a trailer, since it avoids the necessity of providing complicated driving couplings between the trailer and hauling means. Moreover, the above feature enables air conditioning of the interior of the trailer or other equipment while the latter is standing independently of the hauling means.

The foregoing, as well as other objects, will be made more apparent as this description proceeds, especially when considered in connection with the accompanying drawings, wherein—

Figure 1:
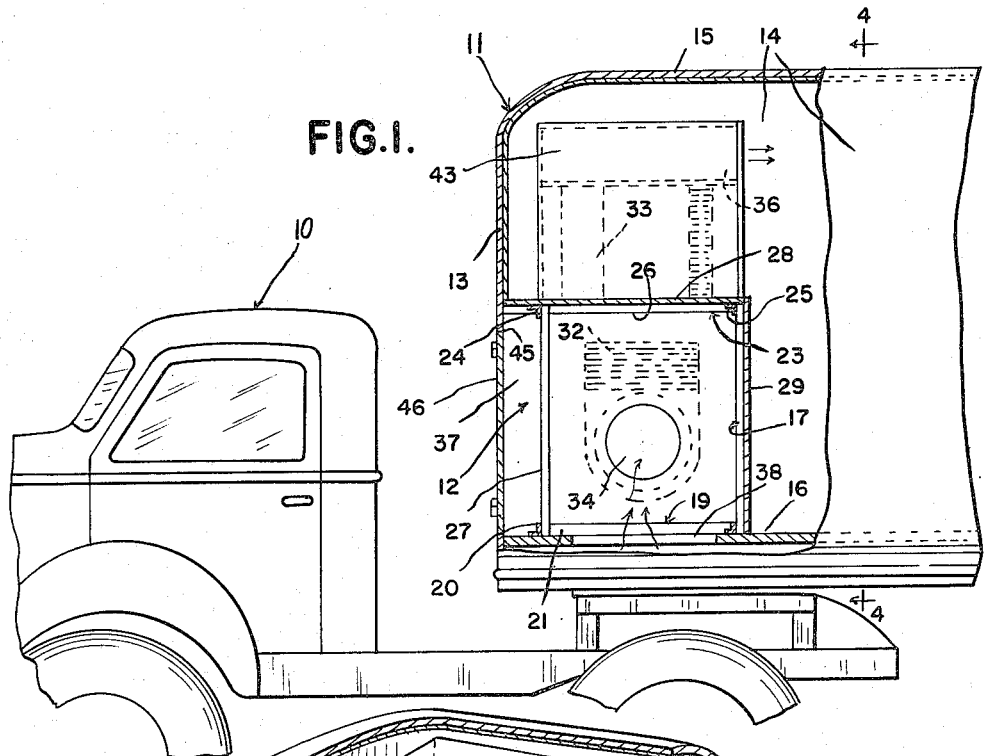
Figure 1 is a fragmentary side elevation of a truck trailer combination having certain parts broken away to illustrate air conditioning apparatus forming the subject matter of this invention.

Although, it will be understood as this description proceeds that the air conditioning unit forming the subject matter of this invention may be successfully employed in numerous different types of transportation equipment to condition the atmosphere in the latter, nevertheless for the purpose of illustrating the invention, I have selected an enclosed type cargo trailer.

With the above in view reference is made to the several figures of the drawings, wherein the reference numeral 10 indicates a tractor or truck for hauling a trailer 11 and 12 indicates an air conditioning unit embodying the features of this invention.

As shown in Figure 1 of the drawings, the tractor 10 is of conventional design and the trailer 11 is coupled to the tractor 10 by any one of the accepted mechanisms available for this purpose. The trailer 11 is provided with an elongated body having front, side, top and bottom walls 13, 14, 15 and 16, respectively. In accordance with conventional practice the rear end (not shown) of the trailer body is open to enable loading and unloading the trailer, although one or more openings may be provided at one or both sides of the body for this purpose, if desired.

Figure 2:
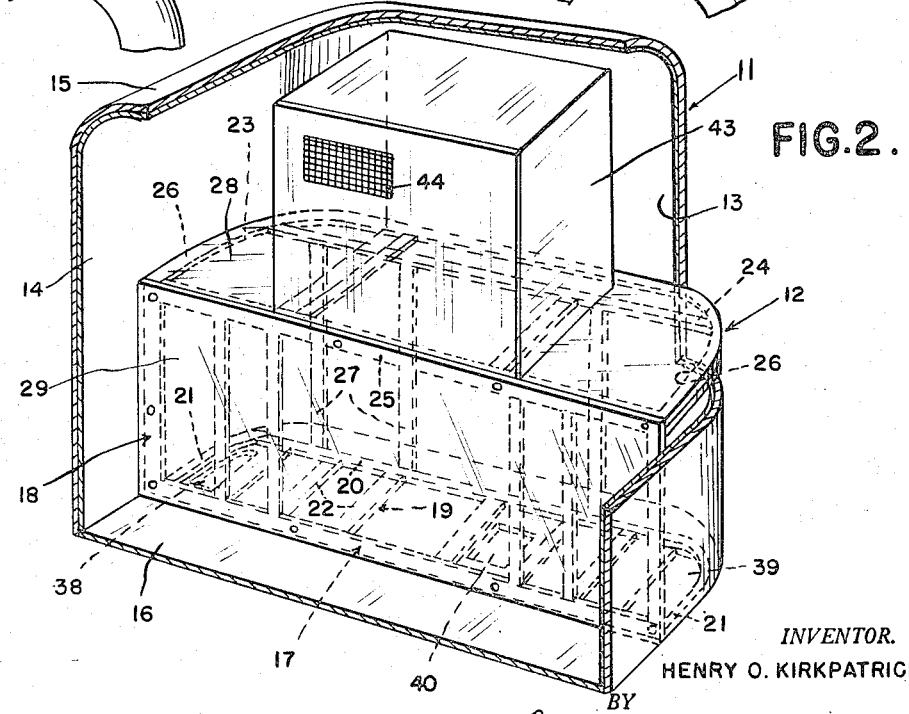
Figure 2 is a fragmentary perspective view illustrating the air conditioning unit and the manner in which the latter fits the forward end portion of the trailer shown in Figure 1.

The air conditioning apparatus 12 is a self contained unit and occupies a position in the front end portion of the trailer 11. In this connection it will be noted that the front end portion of the trailer is transversely curved and the air conditioning unit is nestled in this portion so as to occupy the minimum usable space in the body of the trailer. In detail, the several parts of the air conditioning apparatus are supported as a unit on an open frame structure 17 fabricated from angle iron and having a rear rectangular section 18 corresponding in length to the width of the trailer body. In addition, the frame 17 is provided with a base section 19 having a front bar 20 connected to the bottom bar of the rectangular frame by side bars 21 and cross members 22. The frame 17 is also provided with a top frame section 23 having a front frame member 24 connected to the top frame bar 25 of the rectangular frame section 18 by side frame bars 26 and connected to the frame bar 20 of the bottom section 19 by vertical frame bars 27. The side frame bars 21 and 26 are curved to conform to the curved sides of the trailer body and a correspondingly shaped platform 28 is fixed to the top frame section 23 forming a cover for the frame structure 17. The opposite sides and the front side of the frame structure 17 are not provided with closures but are, nevertheless, closed by the corresponding walls of the trailer body when the frame structure is installed in the trailer body in the position shown in Figure 2 of the drawings. The rear side of the rectangular frame is closed by a closure member 29 removably attached to the rectangular frame section 18. Thus the closure member 29 cooperates with the cover 28 and the upright front and side walls of the vehicle to form a chamber 37.

The air conditioning apparatus carried by the frame structure 17 comprises generally a prime mover, such as an internal combustion engine 30 and refrigerating apparatus of an approved type. The refrigerating apparatus per se forms no part of this invention and, accordingly, is not illustrated or described in detail herein. It is preferred, however, to provide refrigerating apparatus of the general type shown in the Sunday patent, Number 2,263,476 or some similar apparatus having provision for reversing the cycle of operation of the apparatus so that it may be operated to deliver warm air to the interior of the trailer body instead of cold air.

It will suffice to point out that the refrigerating apparatus comprises a compressor 31, condenser 32 and an evaporator 33 connected together in the usual manner to provide the desired air conditioning. All of these parts, together with the internal combustion engine 30 for driving the compressor, as well as the required connections, are supported on the frame structure 17. In addition, the frame structure 17 supports three blowers 34, 35 and 36 also suitably connected to the internal combustion engine 30 for operation thereby. The blowers 34 and 35 are arranged to draw air into the chamber 37 for the air conditioning unit through openings 38 and 39, respectively, in the flooring 16 of the body and to exhaust the air through an opening 40 in the flooring 16. Thus, a circulation of air is provided in the compartment or chamber 37 sufficient to cool the condenser coils and internal combustion engine. The blower 36 is positioned adjacent the evaporator for drawing air through the latter and discharging the air into the body proper of the vehicle.

In detail, the internal combustion engine 30 is mounted on the bottom section 19 of the frame structure 17 and is provided with an exhaust conduit 42 which extends through an opening formed in the flooring 16 of the trailer body so that the products of combustion are discharged into the atmosphere. The condenser 32, blowers 34 and 35, together with the inter-connecting driving mechanisms are also supported on the bottom section 19 of the frame structure 17. The evaporator 33 and associated blower 36 are supported above the frame structure 17 on the platform 28 and are enclosed by a suitable hood 43. The hood 43 is open at the front and is provided at the rear thereof with an outlet opening 44 which communicates with the discharge side of the blower 36 to enable the conditioned air to be circulated in the main portion of the trailer body.

Figure 3:
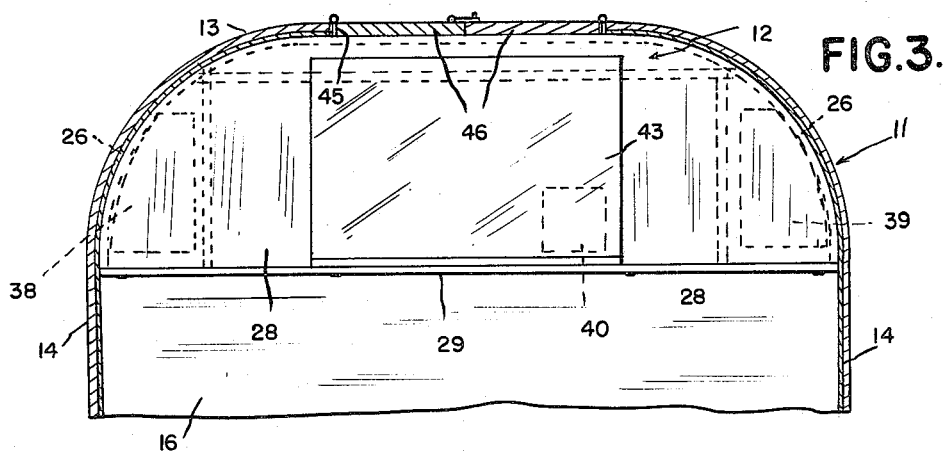
Figure 3 is a horizontal sectional view through the front end portion of the trailer.
Figure 4:
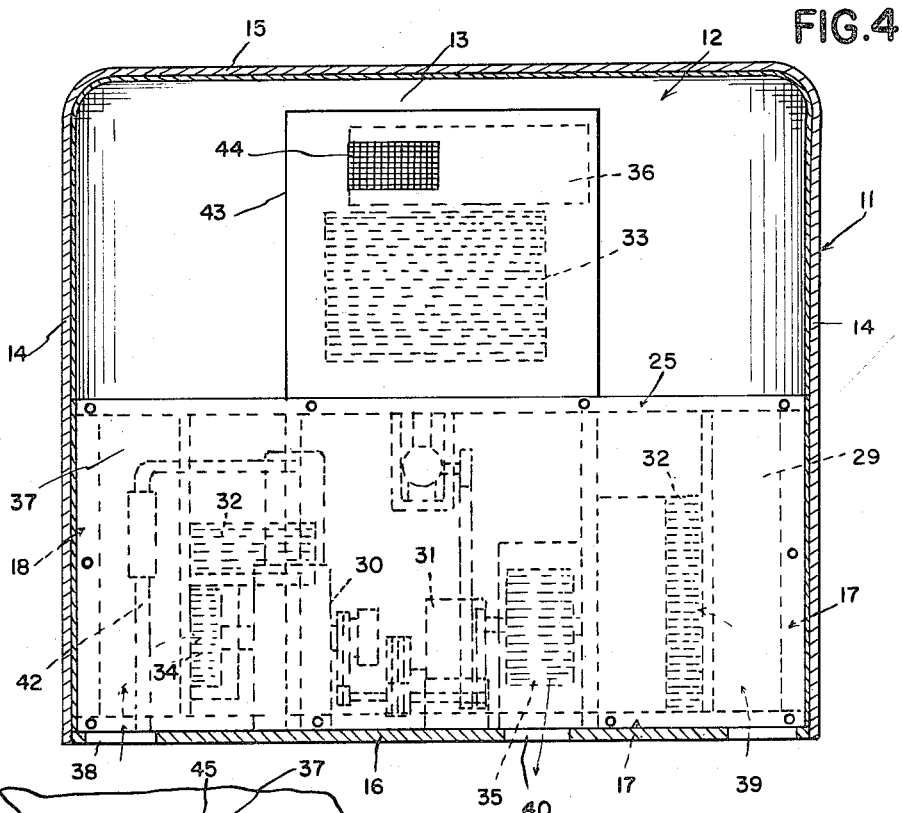
Figure 4 is a cross-sectional view taken on the plane indicated by the line 4—4 of Figure 1.
Figure 5:
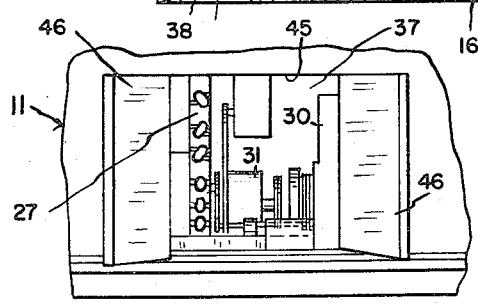
Figure 5 is a fragmentary front elevational view of the trailer body showing the opening through which access to the air conditioning unit may be obtained.

Upon reference to Figures 3 and 5 it will be noted that the front wall 13 of the trailer body is provided with an opening 45 directly opposite the front side of the air conditioning unit and normally closed by suitable doors 46. The opening 45 is of sufficient dimension to enable repairs to be made to practically any one of the parts of the air conditioning unit without the necessity of removing this unit from the trailer body. This feature is of prime importance, because oftentimes it is necessary to repair the air conditioning unit after the trailer body is loaded, and the above construction permits these repairs to be made without interferring in any way with the pay load in the body of the trailer.

It will further be noted from Figure 5 of the drawings that the vertical frame bar 27 directly opposite the opening 45 in the front wall 13 of the trailer body forms a control panel for the various parts of the air conditioning unit. In detail, the control panel forms a mounting for the controls required to defrost the unit or otherwise regulate the operation of the latter to obtain the desired results. Also, if desired, the controls and gages for the internal combustion engine are mounted on the control panel. As a result, all of the controls for the parts of the air conditioning unit requiring regulation are accessible for manipulation through the opening 45 in the front wall 13 of the trailer body.

Thus, from the foregoing, it will be noted that the self contained refrigerating unit may be readily installed in or removed from the trailer body by relatively unskilled workmen. This arrangement eliminates costly tie-ups of the trailer equipment in the event major repairs to the air conditioning unit are required, as it enables replacing the faulty unit with a spare unit in a very short space of time. Also, in the event the air conditioning unit is not required for heating the trailer body in cold weather it may be removed and stored. As a result the space normally occupied by the air conditioning unit may then be employed to accommodate additional pay loads. It is also important to note that the air conditioning unit is entirely independent of the tractor or truck employed for hauling the trailer body, so that the unit may be operated when the trailer is divorced from the hauling equipment. In addition to the above, it will be noted that certain walls of the compartment 37 for the air conditioning unit are formed by the wall portions of the trailer body. This arrangement not only simplifies the air conditioning unit, but also contributes to reducing the weight of the latter.

What I claim as my invention is:

1. Air conditioning apparatus for a closed cargo carrying vehicle, comprising a self-contained portable unit adapted to be completely installed within the interior of a vehicle of the type mentioned at the closed forward end thereof, said unit having a portable frame structure and air conditioning apparatus carried in its entirety by said frame structure, the said frame structure having spaced upright substantially rectangular front and rear sections and connections therebetween providing a hollow open framework of substantially square cross section adapted to rest upon the floor of the vehicle in substantially nestled relation to and be partially closed by the upright front and side walls and floor of the vehicle, means for closing the top of said open framework, including a separate platform secured to said framework and abutting the upright front and side walls of said vehicle, means for closing the rear of said open framework, including a panel detachably secured to said framework and abutting opposite upright side walls of said vehicle, said platform and panel cooperating with the floor and upright front and side walls of the vehicle to close entirely said framework and form a closed chamber, and a hood on top of said chamber, portions respectively of said air conditioning apparatus being within said chamber and hood, the portion within said hood being an evaporator, said closed chamber being provided with means for communication with air inlet and outlet openings in portions of said vehicle whereby air from the atmosphere outside the vehicle may flow to and from said chamber to cool the portion of said air conditioning apparatus within said chamber, and said hood having an outlet opening through which air conditioned by the evaporator within said hood may be discharged into the interior of the vehicle.

2. Air conditioning apparatus for a closed cargo carrying vehicle, comprising a self-contained portable unit adapted to be completely installed within the interior of a vehicle of the type mentioned at the closed forward end thereof, said unit having a portable frame structure and air conditioning apparatus carried in its entirety by said frame structure, the said frame structure having spaced upright substantially rectangular front and rear sections and connections therebetween forming a transversely extending hollow elongated open framework of substantially square cross section adapted to rest upon the floor of the vehicle in substantially nestled relation to and be partially closed by the upright front and side walls and floor of the vehicle, means for closing the top of said open framework, including a separate platform secured to said framework and abutting the upright front and side walls of said vehicle, and means for closing the rear of said open framework, including a panel detachably secured to said framework and abutting opposite upright side walls of said vehicle, said platform and panel cooperating with said floor and upright front and side walls of the vehicle to close completely said framework and form a closed chamber, portions respectively of said air conditioning apparatus being within said chamber and on top of said platform, said closed chamber being provided with means for communication with air inlet and outlet openings in portions of said vehicle whereby air from the atmosphere outside the vehicle may flow to and from said chamber to cool the portion of the air conditioning apparatus within said chamber.

3. Air conditioning apparatus for a closed cargo carrying vehicle, having a transversely curved forward end, comprising a self-contained portable unit adapted to be completely installed within the interior of a vehicle of the type mentioned at the curved forward end thereof, said unit having a portable frame structure and air conditioning apparatus carried in its entirety by said frame structure, the said frame structure having a substantially rectangular base section, upright substantially rectangular front and rear sections on said base section, and a substantially rectangular section on top of said front and rear sections and collectively forming a hollow open framework of substantially square cross section adapted to rest upon the floor of the vehicle in substantially nestled relation to and be partially closed by the upright front and side walls and floor of the vehicle, means for closing the top of said open framework including a single panel type platform secured to said framework and abutting the upright front and side walls of said vehicle, and means for closing the rear of said open framework, including a single panel detachably secured to said framework and abutting opposite upright side walls of said vehicle, said platform and panel cooperating with the floor and upright front and side walls of the vehicle to close completely said framework and form a closed chamber, portions respectively of said air conditioning apparatus being supported within said closed chamber and on top of said platform, the portion on top of said platform being an evaporator, and said closed chamber being provided with means for communication with the atmosphere outside the vehicle whereby air from the atmosphere may circulate within said chamber to cool the portion of said air conditioning apparatus within said chamber.

HENRY O. KIRKPATRICK.

REFERENCES CITED

The following references are of record in the file of this patent:

UNITED STATES PATENTS

| Number | Name | Date |
| --- | --- | --- |
| 204,956 | Doyle | June 18, 1878 |
| 2,202,107 | Korn | May 28, 1940 |
| 2,229,220 | Parks | Jan. 21, 1941 |
| 2,247,028 | Kuntz | June 24, 1941 |
| 2,251,764 | Shrock | Aug. 5, 1941 |
| 2,363,974 | Kirkpatrick | Nov. 28, 1944 |